Feb. 7, 1967  S. G. NEVIUS  3,303,447
LOAD CELL HAVING A SPRING BIASED SHAFT
Filed July 13, 1964
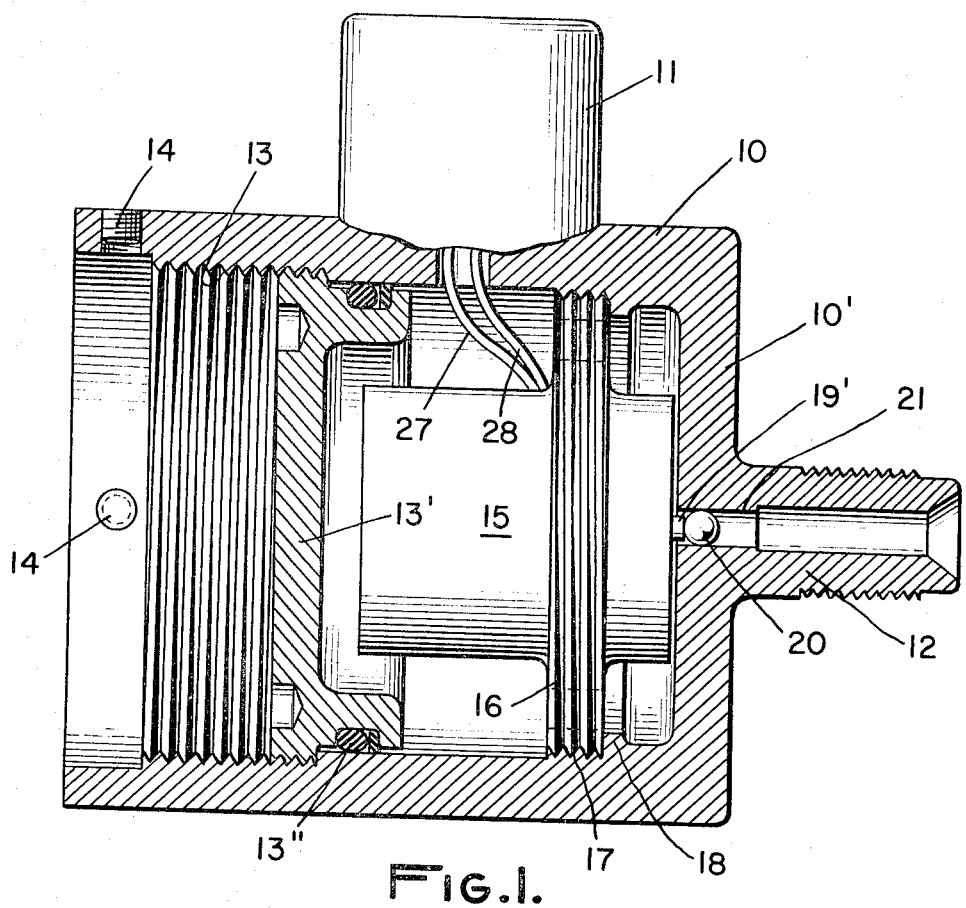
FIG.I.
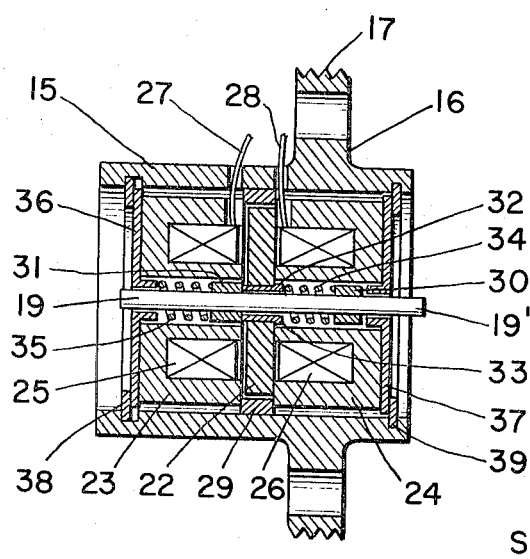
FIG.2.
INVENTOR.
SEARLE G. NEVIUS
BY
Elliott & Pastoriza
ATTORNEYS

United States Patent Office 3,303,447
Patented Feb. 7, 1967

---

3,303,447
LOAD CELL HAVING A SPRING BIASED SHAFT
Searle G. Nevius, Playa del Rey, Calif., assignor to W. C.
Dillon & Company Inc., a corporation of Illinois
Filed July 13, 1964, Ser. No. 382,036
7 Claims. (Cl. 336—30)

This invention generally relates to force and load measuring devices and more particularly concerns a load cell type force measuring device or dynamometer designed to transduce a bending movement of a metal member, in response to a load of force, into a proportional electrical measurement. Load cell devices of this general construction are known in the art, for example, as disclosed in Patent No. 3,092,995, the invention of I. L. Glerum, issued June 11, 1963, for Force Measuring Device.

Although the force measuring device disclosed in Patent No. 3,092,995, adequately fulfills the need for certain application requirements, it is not completely adaptable to mass production and has certain other characteristics which do not lend its advantageous use from the standpoint of calibration and design criteria.

One object, therefore, of the present invention is to provide an improved load cell construction which lends itself quite readily to mass production requirements to meet varying capacity and application criteria with very limited calibrations being required for any specific or given use.

Another object of the present invention is to provide an improved load cell which will maintain its accuracy and linearity under various environmental conditions, regardless, for example, of temperature variations and of the particular orientation of the load cell with respect to the gravity field.

Still another object of the present invention is to provide an improved load cell which will operate satisfactorily even though the imposed force or load may be applied in a direction misaligned with the axis of the load cell.

Still another object of the present invention is to provide an improved load cell which will normally operate satisfactorily despite unusual shock loads or accelerated movement to which it may be subjected.

Still a further object of the present invention is to provide an improved load cell which is readily susceptible of adjustment for varying load or force capacities.

A still further object of the present invention is to provide an improved load cell having a high degree of accuracy, which is adaptable of construction to meet a wide range of capacities, which has only two moving parts, which requires substantially no maintenance, and which is protected against damage in the event of operation beyond its normal working range.

These and other objects and advantages of the present invention are generally achieved by providing an improved load cell comprising a casing having a diaphragm portion thereof which is designed to flex under load. The load may result from either compression, tension, or "push-pull" type applications.

Within the casing are mounted first and second electrical inductance windings in axially spaced opposing relationship. Interposed between the two windings is a common armature member, preferably disc-shaped.

A shaft is disposed within the casing and extends through at least one of the inductance windings. The shaft has one end thereof which is designed to engage a ball rigidly retained by the diaphragm portion of the casing and to co-function therewith. The shaft has another portion thereof which is coupled for movement with the armature. Thus, movement imparted to the shaft by the flexing portion of the casing and the ball held therein, will in turn effect movement of the armature to vary the air gaps between the armature and, respective, windings to thereby provide an electrical signal which constitutes a function of the force imposed on the diaphragm portion of the casing.

The electrical circuitry for the improved load cell of the present invention and the manner in which the variation of the air gaps and thus the flux in the respective windings is sensed and converted into an appropriate readout form a part of applicant's co-pending application entitled, Electrical Load Cell, filed this same date under Serial No. 382,037.

A better understanding of the present invention will be had by reference to the drawings, showing merely an illustrative embodiment, and in which:

FIGURE 1 is a sectional view of the improved load cell according to the present invention without showing the details of the sensing unit mounted therein; and, FIGURE 2 is a sectional view of the sensing unit embodied in the load cell construction of FIGURE 1.

Referring now to the drawings, there is shown in FIGURE 1 an improved load cell according to the present invention including a casing 10 and embodying an electrical connector structure 11 which also may house certain electrical components forming the subject matter of the above referred to co-pending application. The electrical connector, not shown in detail, may also be suitable for a plug-in type connection which connects to a power supply required for the operation of the unit, also disclosed in the co-pending application.

Integrally formed with the casing 10 is a male threaded stud 12 which is designed for coupling to a force exerting member to either exert a compression or tension load on the stud 12 and in turn upon the related casing 10. The casing embodies a diaphragm or end portion 10' which is designed to flex in response to a load imposed upon the male stud member 12. Of course, the other end of the casing 10 must be provided with some type of means for holding it stationary. Towards this end, internal threads 13 are provided within the casing. These threads may accommodate a seal member 13' which as shown, includes an O-ring 13" designed to withstand pressure for underwater usage. Appropriate tool holes, as indicated, may be provided for screwing in the seal 13'. The threads 13 may also be used separately as a means for attaching a load transmitting member or in conjunction with set screws 14. In the alternative, a suitable connection may be made with the casing 10 by using set screws 14 to co-function with appropriate recesses in a force transmitting plug in a conventional manner (not shown).

In the event the load cell is not used under any pressure conditions, the seal member 13' may be provided without the O-ring 13" to function as a dust shield and protective device to prevent tampering with the inner workings of the load cell.

As an important feature of the present invention, there is provided a sensor or sensing unit 15 coupled within the casing 10. The sensing unit 15 is, for this purpose, provided with an increased diameter portion or flange 16 threadedly connected at 17 to an internal part of the casing 10. In order to assure positive indexing of the flange 16 within the casing 10, a shoulder 18 is provided up against which the flange 16 is threaded.

The flange 16 may be provided with appropriate bolt holes in the event it is to be embodied in other structures or attached to a support member in a different manner. However, such bolt holes form no part of the invention in the present application.

As shown more clearly in the view of FIGURE 2, a shaft 19 extends axially into the sensing unit 15 and is provided with a protruding end portion 19' designed to cooperate with a ball 20 contained within the diaphragm portion 10' of the casing 10. The ball 20 is rigidly secured within a bore 21 extending through the male stud 12 and the diaphragm casing end portion 10'. The ball 20 is designed to co-function with the protruding end portion 19' of the shaft 19 in a manner that will be hereafter described.

The sensing unit 15 may now be more clearly described by reference to FIGURE 2.

Positioned within the sensor unit 15 is a disc-shaped armature member 22 axially interposed between a pair of cup-core members 23 and 24, respectively, housing inductor coils 25 and 26. The general construction of these cup-core members and inductor coils is similar to that shown in the above referenced Patent No. 3,092,995, except that the coils in this instance are inductors rather than transformers. Preferably, the cup-cores are formed of ceramic material. The armature functions with the inductance coils to cause a variation in the magnetic flux of the respective inductors according to its axial position there-between. In other words, movement of the armature away from its normal central position will vary the relative air gaps to increase the magnetic flux in one inductor and decrease the magnetic flux in the opposing inductor. This operation and the resulting conversion of this change in magnetic flux to an electrical quantity proportional to the force imposed is more clearly described in applicant's co-pending application previously referred to in this specification. Towards this end, appropriate leads 27 and 28 lead from the coils 25 and 26 to the electrical connector 11 as shown in FIGURE 1.

Continuing with the mechanical construction of the sensing unit, there is shown a spacer 29 in radially spaced relationship about the armature 22 and forming a positive means of indexing the inductor cup-cores 23 and 24 relative to the armature 22.

The shaft 19 has press-fitted thereon bushing members 30 and 31. The armature 22, as such, is mounted on a guide bushing 32 provided with a flange portion 33. The guide bushing 32 is of a diameter such that it floats on the shaft 19.

Encircling the shaft 19 is a spring means 34 interposed between the guide bushing 32 and the bushing 30. The ends of the shaft 19 are journalled in end bushings 36 and 37, respectively. Interposed between the bushing 36 and the bushing 31, is another spring member 35 which urges the shaft 19 in a direction towards the right, as viewed in FIGURES 1 and 2, or in a direction urging engagement of the free end 19' of the shaft 19 with the ball 20. Thus, the shaft 19 is free to move with respect to the end bushings 36 and 37, and with respect to the guide bushing 32; however, it is fixed relative to the bushings 31 and 30 which are press fitted thereon.

In order to retain the end bushings 36 and 37 in place as well as the inner parts of the sensing unit 15, retaining rings 38 and 39 may be appropriately provided near the ends of the sensing unit 15. The retaining rings 38 and 39 may be conventional split-ring type retaining members, for example, known by the trade mark "Truarc."

The operation of the improved load cell, according to the present invention, may now be described.

From an examination of FIGURES 1 and 2, it will be appreciated that the spring means 35 by engaging the fixed bushing 31 urges or biases the shaft 19 towards a position such that the protruding free end portion 19' thereof will engage the ball 20. In assembly, the sensing unit 15 is first threaded into the position at 17; the leads 27 and 28 are connected to the connector 11, and thereafter the sealing member 13' is threaded into position. The ball 20 is slightly oversized so that it must be forced into the bore 21 with some kind of a tool. Towards this end, a cup-shaped member may be used which has a projecting stem which is designed to engage the ball 20 as the body of the cup-shaped member, for example, is threaded onto the male stud 12. The ball 20 is then forced into the bore 21 until it contacts the protruding end 19' of the shaft 19 and until a given reading is obtained through the various electrical connections. Thus, although the shoulder 18 will form a means of indexing the sensing unit 15 with respect to the casing 10 of the load cell, the actual adjustment will be accomplished by the positioning of the ball 20 against the protruding end 19' of the shaft.

Assuming a compressive load is applied to the male stud 12 and that suitable means are employed for coupling to the other end of the unit with the threads 13 or set screws 14 to resist movement of the load cell, the force imposed will tend to bow the diaphragm portion 10' of the cell casing 10 inwardly with the result that the ball 20 will correspondingly force the end portion 19' of the shaft inwardly and urge the shaft and press-fitted bushings 30 and 31 in the same direction. In consequence, the spring means 34 will tend to force the guide bushing 32 and the armature 22 inwardly into closer axial disposition with respect to the inductor 23–25 and away from the inductor 24–26. Thus, the magnetic flux will increase with respect to the former and decrease with respect to the latter with an appropriate electrical signal being given through leads 27 and 28 to the related components in the connector housing 11 and the connected readout device, all as more clearly shown and described in applicant's above-referred to co-pending application.

In the event that a tensile force is exerted on the male stud 12 and assuming the other end of the load cell to be restrained against movement, the diaphragm portion 10' of the casing 10 will bow outwardly and permit the shaft 19 to maintain its engagement with the ball 20. The shaft 19 is urged towards the ball 20 by the spring means 35 which engages the bushing 31 secured to the shaft 19 and urges this bushing into engagement with the armature 22. Thus, the armature 22 will move towards the inductor 24–26 and away from the inductor 23–25. Again, an appropriate signal will appear on the leads 27 and 28 and be indicated in the readout device. The electrical components and circuitry sense the signals to reflect an indication of the force exerted on the load cell through the male stud 12 and the opposing end.

It will be noted that the sensing unit 15 is provided with a flange portion 16 which is threadedly connected to the inner sidewalls of the cell casing 10 at a point proximate the point at which the ball 20 engages the protruding end 19' of the shaft 19. Thus, in the event of any wide variation in temperature, no appreciable expansion or contraction of the casing 10 will as such affect the relative position of the armature 22 since the movement of the ball 20 will be accompanied by a relatively equal movement of the sensing unit 15. Thus, no substantial differential movement of the shaft 19 will occur with respect to the ball 20, and no significant error will be introduced from these major components as a result of any temperature change.

It is also to be noted that the diaphragm and portion 10' of the casing 10 embodies a flat construction rather than the tapered construction as shown, for example in Patent No. 3,092,995, herein above referred to. It has been found that such a flat construction enables a greater degree of accuracy. This factor, in combination with the fact that a ball 20 is employed enables the load cell to be angularly misaligned with respect to the force imposed thereon and still attain relative accuracy since the ball effectively reduces any friction in this area. Towards this end, it may be noted that the end 19' of the shaft is preferably polished to an optical flatness of better than one micron. The ball 20, of course, must be a very hard and polished ball.

As a safety factor, it may be noted that the spring means 34 functions as an over-travel spring to protect the armature against damage in the event any sudden compressive force is imposed upon the end 19' of the shaft 19. In the event of an excessive tensile force, the ball 20 will separate from the shaft end 19' such that no damage occurs to the unit.

It has been found that this load cell, in one construction, will yield an accuracy of 3/10% over a range of capacities varying from 100 pounds to 6000 pounds, depending upon the thickness of the diaphragm end portion 10' or dome section as it is sometimes termed. The actual total deflection is limited to four-thousandths of an inch in order to obtain full scale reading; in consequence, it will be appreciated that the movement of the ball 20 is very slight to accomplish relative movement of the armature and the variation in the magnetic flux.

Preferably, the casing 10 and most of the housing components are machined from stainless steel. Towards this end, the bore 21 may, if desired, be used as centering hole for the tail stock of a lathe during the machining operations of the load cell.

Certain other advantages of the improved load cell, according to the present invention, will occur to those skilled in the art. Also, additional advantages will be stressed in applicant's co-pending application herein referred to. It will be appreciated, however, that many changes and modifications may be made within the scope and spirit of the present invention without departing from the essential characteristics thereof. Such modifications and changes are deemed to fall within and be embraced by the following claims.

What is claimed is:

1. An improved load cell comprising: a casing having a diaphragm portion designed to flex under load; first electrical windings mounted within said casing; second electrical windings mounted within said casing; a common disc-shaped armature member axially interposed in spaced relationship between said electrical windings to cause a variation in the magnetic flux of said first and second electrical windings; a shaft movably received through said armature member; a ball member retained in said diaphragm portion and designed to be engaged by said shaft; and means for causing said armature to follow movement of said shaft in response to said load.

2. An improved load cell comprising: a casing; a first inductance winding mounted within said casing; a second inductance winding mounted within said casing, said second inductance winding being axially spaced from said first inductance winding; a common disc-shaped armature member for said first and second inductance windings axially interposed in spaced relationship between said first and second inductance windings; a shaft axially extending through at least one of said inductance windings, said shaft movably received through said armature member, means for causing said armature to follow movement of said shaft, whereby axial movement imparted to said shaft will in turn effect movement of said armature member to cause a variation in the magnetic flux in said first and second inductance windings when the same are excited; said casing having a diaphragm portion designed to flex under load; a ball retained by said diaphragm portion designed to co-function with said shaft in response to variation in said load to in turn effect movement of said armature to vary said flux in said first and second inductance windings.

3. An improved load cell comprising: a casing, said casing having a diphragm portion designed to flex under load; a sensing unit mounted within said casing, said sensing unit having a shaft protruding therefrom, means biasing said shaft towards a position of extension from said sensing unit; means in said diaphragm designed to co-function with said shaft; electrical means in said sensing unit for sensing movement of said shaft in response to the co-functioning of said means in said diaphragm portion therewith.

4. An improved load cell, according to claim 3, in which said means in said diaphragm portion comprises a ball retained in said diaphragm portion designed to co-function with said shaft.

5. An improved load cell comprising: a casing having a diaphragm portion designed to flex under load, said diaphragm portion including a ball rigidly secured thereto; a sensing unit mounted within said casing; a first inductance winding mounted within said sensing unit; a second inductance winding mounted within said sensing unit, said second inductance winding being axially spaced from said first inductance winding; a common disc-shaped armature member for said first and second inductance windings axially interposed in spaced relationship between said first and second inductance windings; a shaft extending through at least one of said inductance windings, said shaft extending movably through said armature member, and said shaft extending outwardly from said sensing unit to co-function with said ball; means biasing said shaft towards said ball, whereby flexing of said diaphragm portion of said casing will force said ball against said shaft or vice versa to in turn cause movement of said armature and vary the flux relationship between said first and second inductance windings.

6. An improved load cell comprising: a casing having a diaphragm designed to flex under load and including a ball retained therein; a separate sensing unit mounted within said casing; a first inductance winding within said sensing unit; a second inductance winding within said sensing unit, said second inductance winding being axially spaced from said first inductance winding; a common disc-shaped armature member for said first and second inductance windings axially interposed in spaced relationship therebetween; a shaft axially extending through at least one of said inductance windings; spring means biasing said shaft towards a position such that one end portion thereof engages said ball, whereby movement of said diaphragm portion of said casing will in turn effect movement of said shaft to vary the flux relationship between first and second inductance windings.

7. An improved load cell comprising: a casing having a diaphragm portion designed to flex under load; a ball retained in said diaphragm portion; a sensing unit mounted within said casing; a first inductance winding mounted within said sensing unit; a second inductance winding being mounted within said sensing unit, said second inductance winding being axially spaced from said first inductance winding; a common disc-shaped armature member for said first and second inductance windings and axially interposed in spaced relationship between said first and second inductance windings; a shaft axially extending through at least one of said inductance windings, said shaft being connected wtih said armature member; spring means biasing said shaft so that an end thereof protrudes from said sensing unit to engage said ball; said armature being loosely mounted on said shaft; and means for causing said armature to follow movement of said shaft.

References Cited by the Examiner

UNITED STATES PATENTS

| | | | |
|---|---|---|---|
| 3,092,995 | 6/1963 | Glerum | 73—141 |
| 3,201,984 | 8/1965 | Hinnah et al. | 73—141 |

LEWIS H. MYERS, *Primary Examiner.*

C. TORRES, T. J. KOZMA, *Assistant Examiners.*